US010657143B2

(12) United States Patent
Wang et al.

(10) Patent No.: US 10,657,143 B2
(45) Date of Patent: May 19, 2020

(54) RECOMMENDING A DATA HANDLING METHOD FOR A PENDING DATA HANDLING PROCESS

(71) Applicant: Alibaba Group Holding Limited, George Town (KY)

(72) Inventors: Dandan Wang, Hangzhou (CN); Xiaofeng Pan, Hangzhou (CN); Di Xu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 234 days.

(21) Appl. No.: 15/717,445

(22) Filed: Sep. 27, 2017

(65) Prior Publication Data

US 2018/0018335 A1    Jan. 18, 2018

(30) Foreign Application Priority Data

Apr. 1, 2015  (CN) .......................... 2015 1 0151908

(51) Int. Cl.
*G06F 16/00* (2019.01)
*G06F 16/2457* (2019.01)
(Continued)

(52) U.S. Cl.
CPC .......... *G06F 16/24578* (2019.01); *G06F 7/08* (2013.01); *G06F 16/219* (2019.01); *G06F 16/285* (2019.01)

(58) Field of Classification Search
CPC ............................................... G06F 16/24578
(Continued)

(56) References Cited

U.S. PATENT DOCUMENTS

2003/0225777 A1* 12/2003 Marsh ..................... H04N 7/163
2008/0134043 A1*  6/2008 Georgis ................... H04N 7/10
715/733

(Continued)

FOREIGN PATENT DOCUMENTS

CN        101005490        7/2007
CN        101599151       12/2009
(Continued)

OTHER PUBLICATIONS

Han, "Operators Choices in Mobile Payment," China New Telecommunications, 2015, 23:36-38 (Abstract).

(Continued)

*Primary Examiner* — Chelcie L Daye
(74) *Attorney, Agent, or Firm* — Fish & Richardson P.C.

(57) ABSTRACT

Attribute information of a pending data handling process to be performed is identified. Historical data handling processes for a same application scenario as the pending data handling process are identified based on the attribute information. A time that each identified historical data handling process is performed and methods used to perform the identified historical data handling processes are also identified. A weighting coefficient for each identified historical data handling process is determined. Weighted identified historical data handling processes are calculated by applying the weight coefficient to each identified historical data handling process. A recommended weight for each method used to perform the identified historical data handling processes is determined by combining weighted identified historical data handling processes that use the same method. A method that has the highest recommended weight to perform the pending data handling process is recommended.

20 Claims, 7 Drawing Sheets

(51) Int. Cl.
*G06F 16/21* (2019.01)
*G06F 16/28* (2019.01)
*G06F 7/08* (2006.01)

(58) Field of Classification Search
USPC .......................................................... 707/727
See application file for complete search history.

(56) References Cited

U.S. PATENT DOCUMENTS

| 2010/0088151 | A1 | 4/2010 | Kim et al. | |
|---|---|---|---|---|
| 2011/0112994 | A1* | 5/2011 | Goto | G06Q 30/02 706/12 |

FOREIGN PATENT DOCUMENTS

| CN | 102314649 | 1/2012 |
|---|---|---|
| CN | 102376131 | 3/2012 |
| CN | 102467577 | 5/2012 |
| CN | 103116581 | 5/2013 |
| CN | 103903138 | 7/2014 |
| JP | 2001350930 | 12/2001 |
| JP | 2008186089 | 8/2008 |
| KR | 20130089735 | 8/2013 |
| KR | 20140133240 | 11/2014 |
| KR | 20150015545 | 2/2015 |

OTHER PUBLICATIONS

Lan, "Research on Electronic Wallet Technology in Mobile Payment," Electronic Technology & Software Engineering, 2015, 3 pages.
International search Report issued by the International Searching Authority in International Application No. PCT/CN2016/076411 dated Jun. 12, 2016; 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

RECOMMENDING A DATA HANDLING METHOD FOR A PENDING DATA HANDLING PROCESS

This application is a continuation of PCT Application No. PCT/CN2016/076411, filed on Mar. 15, 2016, which claims priority to Chinese Patent Application No. 201510151908.7, filed on Apr. 1, 2015, the entire contents of each are hereby incorporated by reference.

TECHNICAL FIELD

This disclosure relates to data handling, and more particularly to recommending a data handling method for a pending data handling process.

BACKGROUND

With the development of Internet technologies, Internet-based applications (or "Applications") are being used on an increasing basis. The Applications have also become more complicated and generally require particular data handling to complete a pending data handling process. Some Applications can also require use of more than one data handling method.

While a data handling method that has a highest historical usage rate may be recommended first to a user to perform a pending data handling process, the highest historical usage rate may not be the most suitable data handling method to complete the pending data handling process. For example, in payment data processing, more and more payment applications promote simple user interfaces with a "minimalist cashier," where only one payment method may be shown on the user interface. When the payment method is not ideal for a user, the user may need to manually switch and select an alternative payment method. However, reselecting data handling methods can consume additional time and reduce overall data handling efficiency.

SUMMARY

The present disclosure describes methods and systems, including computer-implemented methods, computer program products, and computer systems for recommending a data handling method for a pending data handling process.

In an implementation, attribute information of a pending data handling process to be performed is identified. Historical data handling processes for a same application scenario as the pending data handling process are identified based on the attribute information. A time that each identified historical data handling process is performed and methods used to perform the identified historical data handling processes are also identified. A weighting coefficient for each identified historical data handling process is determined. The weighting coefficient is larger when the time of the identified historical data handling process is more recent. Weighted identified historical data handling processes are calculated by applying the weight coefficient to each identified historical data handling process. A recommended weight for each method used to perform the identified historical data handling processes is determined by combining weighted identified historical data handling processes that use the same method. A method that has the highest recommended weight to perform the pending data handling process is recommended.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, to recommend a data handling method for a pending data handling process. The recommended data handling method can conform closely to a user's preference for a data handling method. Accordingly, the probability that the recommended data handling method is suitable for the pending data handling task or conforms to a user's preference may be higher. As a result, performance efficiency of data handling methods may be improved. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
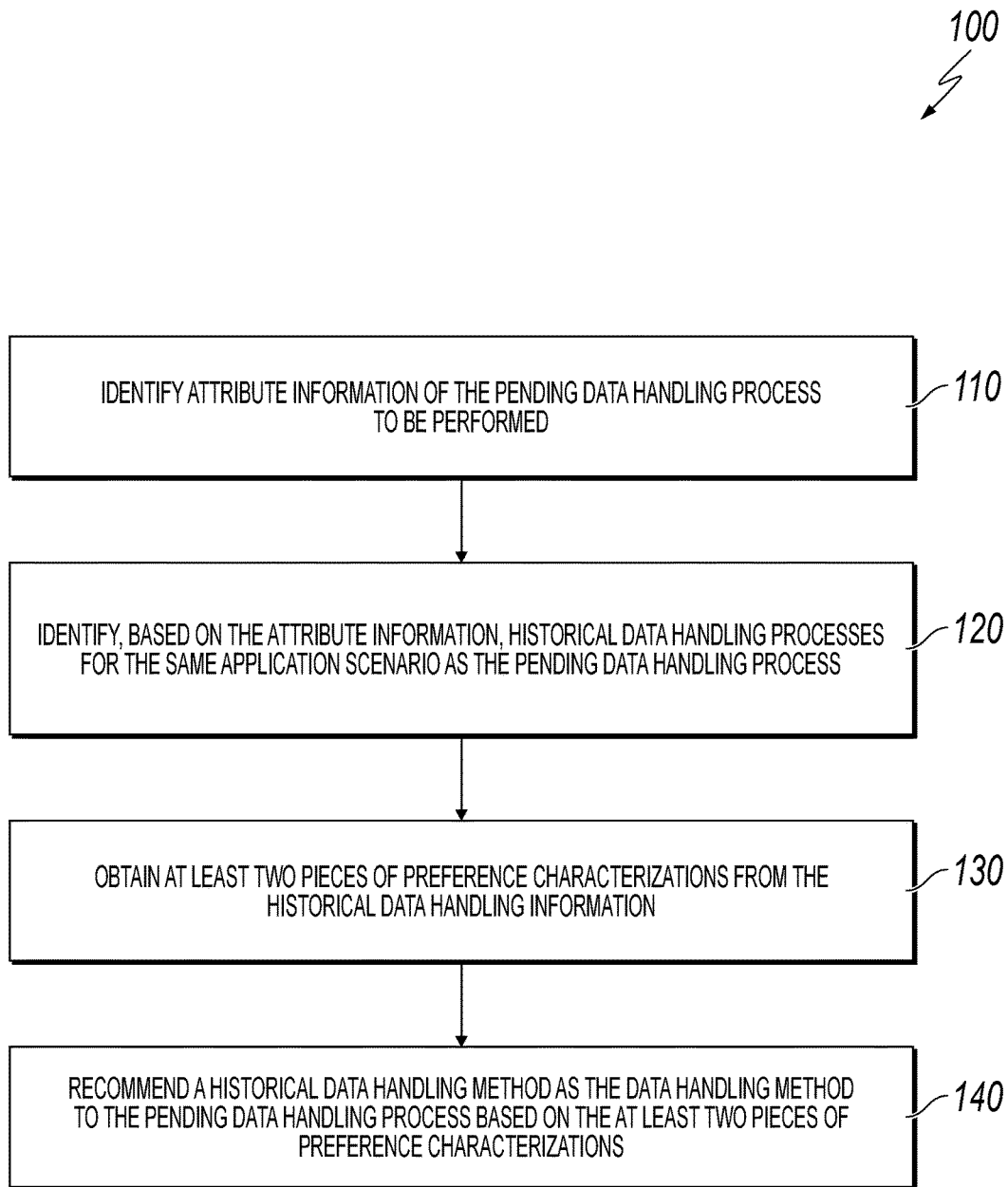
FIG. 1 is a flowchart illustrating an example method for data handling, according to an implementation of the present disclosure.

The following detailed description describes a technique for recommending a data handling method for a pending data handling process based on historical data handling processes performed by a user, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

With the development of Internet technologies, Internet-based applications (or "Applications") are being used on an increasing basis. The Applications have also become more complicated and generally require particular data handling to complete a pending data handling process. Some Applications can also require use of more than one data handling method.

While a data handling method that has a highest historical usage rate may be recommended first to a user to perform a pending data handling process, the highest historical usage rate may not be the most suitable data handling method to complete the pending data handling process. For example, in payment data processing, more and more payment applications promote simple user interfaces with a "minimalist cashier," where only one payment method may be shown on the user interface. When the payment method is not ideal for a user, the user may need to manually switch and select an alternative payment method. However, reselecting data handling methods can consume additional time and reduce overall data handling efficiency.

In some cases, a described technique can recommend one or more data handling methods for a pending data handling process based on a user's historical data handling preferences. In these cases, a recommended data handling method can conform closely to a user's preference for a data handling method. Accordingly, the probability that the recommended data handling method is suitable for the pending data handling task or conforms to a user's preference may be higher. As a result, performance efficiency of data handling methods may be improved. In order to better represent the use preferences of historical data handling methods, information reflecting a user's historical data handling preference can be obtained. Such information can be referred to as preference characterizations.

Historical data handling can refer to data handling processes that have been performed and completed, and can include historical data of a recent time period (for example, data generated in the last three months). A pending data handling process can refer to a data handling process pending execution or performance by a computing device (for example, a mobile computing device). The historical data handling process and the pending data handling process may can be associated with a similar type of data processing application scenario. Application scenarios can include any application scenario, such as a payment service, a download service, or a search service.

The historical data handling process and the pending data handling process can be performed by one or more data handling methods. Accordingly, historical data handling methods can refer to data handling methods used to handle historical data handling processes similar to a pending data handling process for an application scenario. Historical data handling preferences can refer to a user's preferred data handling method in an application scenario used by the pending data handling process.

The data handling methods to be recommended to the pending data handling process can vary based on different application scenarios. For example, using a payment service application scenario, a particular data handling method to be recommended can include a payment function, such as payment methods offered by credit cards, bank cards, TEN-PAY, APPLE PAY, or ALIPAY.

FIG. 1 is a flowchart illustrating an example method 100 for recommending data handling methods for a pending data handling process, according to an implementation. For clarity of presentation, the description that follows generally describes method 100 in the context of the other figures in this description. However, it will be understood that method 100 can be performed, for example, by any suitable system, environment, software, and hardware, or a combination of systems, environments, software, and hardware, as appropriate. In some implementations, various steps of method 100 can be run in parallel, in combination, in loops, or in any order.

At a high-level, method 100 begins with identifying historical data handling information that corresponds to a pending data handling process. In some cases, the identification can be based on attributes associated with the pending data handling process. Using the attributes, preference characterizations can be obtained from historical data handling information. The preference characterizations can reflect a user's historical data handling preference(s). A data handling method can then be recommended to the pending data handling process based on the preference characterizations.

At 110, method 100 identifies attribute information associated with the pending data handling process to be performed. In some cases, the attribute information of a pending data handling process can include a user identifier, a value of a data object, and a time the pending data handling process is to be performed.

In some implementations, determining historical data handling information corresponding to the pending data handling process based on identified attribute information can include one or more of the following: 1) obtaining historical data handling information related to a user identifier of the pending data handling process; 2) obtaining historical data handling information when the value of a data object of the pending data handling process is within a predetermined value range; and 3) obtaining historical data handling information when the time of the pending data handling process is within a predetermined time range. The historical data handling information is related to a user identifier of the pending data handling process, and is produced at a point in time which is chronologically no further than a specific amount of time from the present time. For example, the specific amount of time can be one month, two months, or three months. From 110, method 100 proceeds to 120.

At 120, method 100 identifies, based on the attribute information, historical data handling processes for the same application scenario as the pending data handling process. For example, if the pending data handling process is a payment process, method 100 can determine historical payment processes associated with the same user as the identified historical data handling processes. From 120, method 100 proceeds to 130.

At 130, method 100 obtains preference characterizations (for example, two or more pieces of preference characterization data) from the historical data handling information. In some cases, the preference characterizations can reflect a user's historical data handling preference. Accordingly, a recommended data handling method is more likely to meet the needs of the pending data handling process when it conforms to the user's historical preferences. As a result, overall efficiency of data handling can be improved.

In some cases, the preference characterizations can include historical data type, time that the historical data handling processes were performed, methods used for historical data handling, data object associated with the historical data handling processes, and geographical locations where the historical data handling processes were performed.

Data handling processes completed before a current time can be considered historical data handling processes. In some cases, a large number of historical data handling processes can be available. In some cases, historical data handling processes performed further in time from the current time can be considered to have less weight in determining a recommended data handling method than a data handling method performed more recently. In some cases, historical data handling processes within a predetermined time period can be considered in order to reduce an amount of possible data to be analyzed. For example, a time period can be predetermined as from three to five days, two weeks, or one to three months prior to the current time. In such cases, the preference characterizations (for example, using at least two pieces of preference characterization data) can include the time the historical data handling processes were performed in the predetermined time period, types of historical data handling methods used in the predetermined time period, and data objects associated with the historical data handling. For example, a data object can contain a payment amount, but only historical transactions over 100.00 USD are considered. From 130, method 100 proceeds to 140.

At 140, method 100 recommends a historical data handling method as a current data handling method to the pending data handling process based on the preference characterizations (for example, using at least two pieces of preference characterization data). In some cases, the preference characterizations can include a time that the historical data handling process was performed, historical data handling method types, and data object(s) associated with the historical data handling method. In such cases, recommending data handling methods to a pending task can include sorting the historical data handling methods according to one or more of the time the historical data handling processes were performed, types of the historical data handling methods, and data objects of the historical data handling, and recommending a data handling method to a pending data handling process based on the sorting result. Implementations of recommending a data handling method to a pending data handling process are further described with respect to FIGS. 2A, 2B, and 3. After 140, method 100 ends.

In some cases, the user may have only used one type of historical data handling method. In such cases, the historical data handling method can be recommended directly as the data handling method for the pending data handling process. In some cases, the process of recommending a data handling method to a pending data handling process can further include: 1) determining a weighting coefficient corresponding to each of the time the data handling process was performed, the type of the historical data handling method, and the data object of the historical data handling; 2) calculating a weighted average of the time the historical data handling process was performed, the type of the historical data handling method, and the data object of the historical data handling based on their weighting coefficients to obtain a recommended weight for each historical data handling method; and 3) sorting the historical data handling methods based on the recommended weight.

In some implementations, the sorting of the recommended weight can be in a descending order or in an ascending order. If the data handling methods are sorted according to the recommended weight in a descending order, the first data handling method may be recommended to the pending data handling process. If the data handling methods are sorted in an ascending order, the last data handling method may be recommended to the pending data handling process. In other cases, different data handling methods can be selected from the sorted data handling methods depending on particular functional needs associated with a data handling method or a pending data handling process. For example, in some implementations, following sorting, one or more criterion consistent with this disclosure can be used to make a selection of a particular data handling method.

Figure 2A:
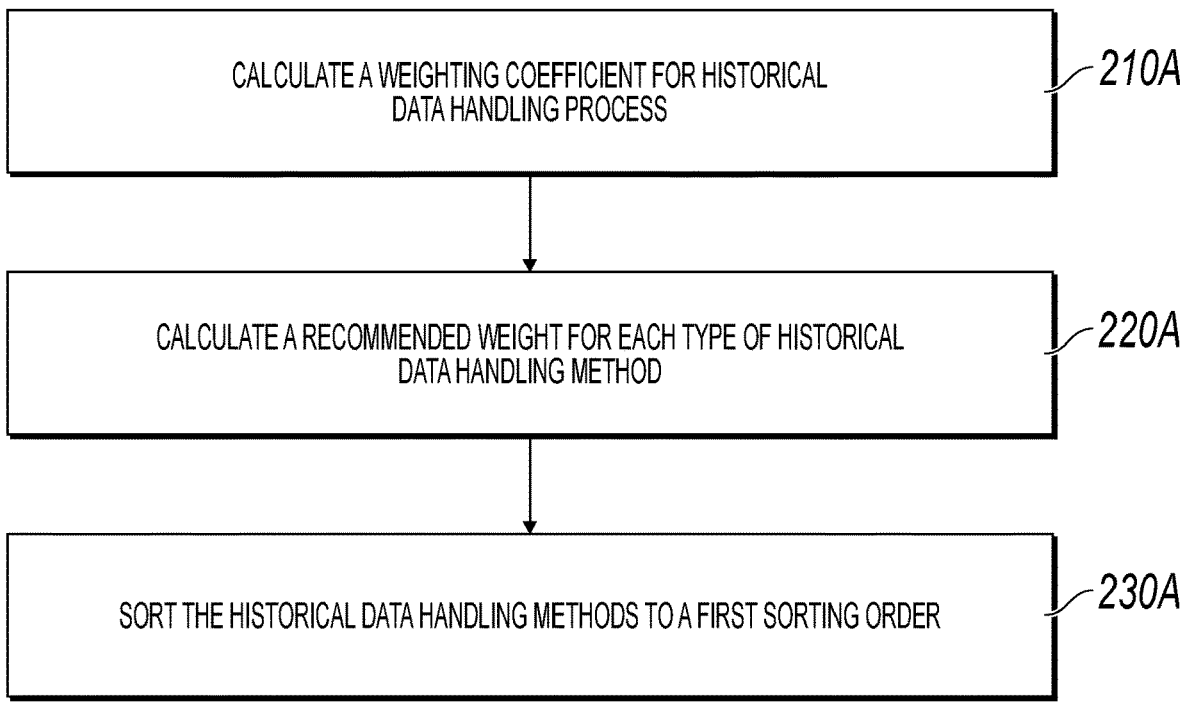
FIG. 2A is a flowchart illustrating an example method for sorting historical data handling methods, according to an implementation of the present disclosure.

FIG. 2A is a flow chart illustrating an example method 200a for sorting historical data handling methods, according to an implementation of the present disclosure. For clarity of presentation, the description that follows generally describes method 200a in the context of the other figures in this description. However, it will be understood that method 200a can be performed, for example, by any suitable system, environment, software, and hardware, or a combination of systems, environments, software, and hardware, as appropriate. In some implementations, various steps of method 200a can be run in parallel, in combination, in loops, or in any order.

At 210a, method 200a calculates a weighting coefficient for each historical data handling process based on the time the historical data handling process was performed. In some cases, recommended calculated weight of a historical data handling process can be determined based on how far apart chronologically the performance time of historical data handling process is from a current time for performing a pending data handling process. In some implementations, the older the data handling process, the smaller weight it can be considered to have in a determination of a data handling method recommendation. For example, a weighting coefficient corresponding to a historical data handling process can be calculated as follows:

$$f_i = \frac{1}{\text{pre\_date} - d_i}, \tag{1}$$

where $f_i$ represents the weighting coefficient to the ith historical data handling process, pre_date represents the present time for performing the pending data handling process, $d_i$ represents the time the ith historical data handling process was performed, and i=1, 2, ..., N, where N is the number of historical data handling processes performed for the pending data handling process's application scenario. From 210a, the method 200a proceeds to 220a.

At 220a, method 200a calculates a recommended weight for each historical data handling method type. The recommended weight for a historical data handling method type can be calculated by adding the all the weighting coefficients of historical data handling process performed by the same data handling method, which can be expressed as:

$$\text{type\_sum}_l = \Sigma_x f_l \tag{2},$$

where type_sum$_l$ represents the recommended weight for the lth type of historical data handling method. The number of historical data handling process using the lth type of data handling method is x, and $f_l$ represents the weighting coefficient of one of the historical data handling process using the lth type of data handling method. As shown in Equation (2), the recommended weight for the lth type of historical data handling method can be calculated as the summation of all weighting coefficients corresponding to the historical data handling process using the lth type of data handling method. From 220*a*, the method 200*a* proceeds to 230*a*.

At 230*a*, method 200*a* sorts the historical data handling methods to a first sorting order based on their corresponding recommended weight. The sorting of the recommended weight can be in a descending order or an ascending order. In some implementations, the historical data handling method with the highest recommended weight may be recommended as the data handling method for the pending data handling process. In other cases, a different historical data handling method can be selected from the sorted historical data handling methods depending on particular functional needs associated with a historical data handling method or a pending data handling process. For example, in some implementations, following sorting, one or more criterion consistent with this disclosure can be used to make a selection of a particular historical data handling method. After 230*a*, method 230*a* ends.

Figure 2B:
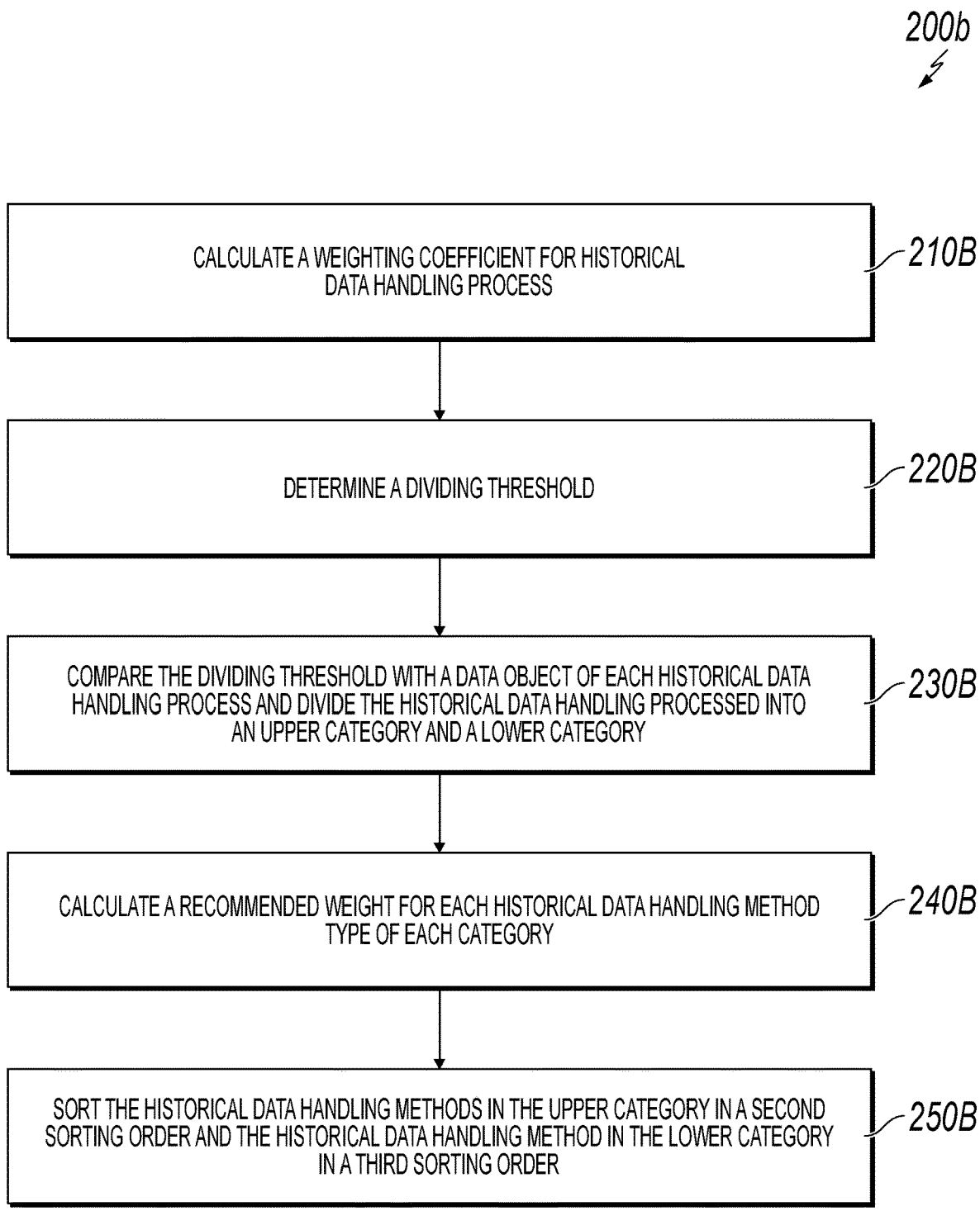
FIG. 2B is a flowchart illustrating another example method for sorting historical data handling methods, according to an implementation of the present disclosure.

FIG. 2B is a flow chart illustrating another example method 200*b* for sorting historical data handling methods, according to an implementation of the present disclosure. For clarity of presentation, the description that follows generally describes method 200*b* in the context of the other figures in this description. However, it will be understood that method 200*b* can be performed, for example, by any suitable system, environment, software, and hardware, or a combination of systems, environments, software, and hardware, as appropriate. In some implementations, various steps of method 200*b* can be run in parallel, in combination, in loops, or in any order.

At 210*b*, method 200*b* calculates a weighting coefficient for each historical data handling process based on the time the historical data handling process was performed. The weighting coefficient can be calculated based on the method described in 210 of FIG. 2. From 210*b*, method 200*b* proceeds to 220*b*.

At 220*b*, method 200*b* determines a dividing threshold value for dividing historical data handling processes into an upper category and a lower category. In some cases, more than one dividing threshold value can be determined and the historical data handling processes can be divided by the dividing threshold values into more than two categories. Determining a dividing threshold value is further discussed in the description of FIG. 4. From 220*b*, method 200*b* proceeds to 230*b*.

At 230*b*, method 200*b* compares the dividing threshold value with a data object value of each historical data handling process and divide the historical data handling processes into the upper category and the lower category based on the comparison. Historical data handling processes with data object values greater than the dividing threshold value can be categorized are part of the upper category, while historical data handling process with data object values less than or equal to the dividing threshold value can be categorized into the lower category. From 230*b*, method 200*b* proceeds to 240*b*.

At 240*b*, method 200*b* calculates, for each category, a recommended weight for each historical data handling method type. In some implementations, the calculation can be performed based on Equation (2), as described with respect to FIG. 2A. For example, if historical data handling processes in the upper category use L types of data handling methods, for a type of historical data handling method l that is one of the L types, a recommended weight can be calculated by adding weighting coefficients of all historical data handling methods in the upper category that use the type l data handling method. In this example, x becomes the number of historical data handling methods in the upper category that use the type 1 data handling method. The recommended weight for each historical data handling method type in the lower category can be calculated using the same method. From 240*b*, process 200*b* proceeds to 250*b*.

At 250*b*, method 200*b* sorts the historical data handling methods in the upper category in a second sorting order based on their corresponding recommended weights, and can sort the historical data handling methods in the lower category in a third sorting order based on their corresponding recommended weights. In some cases, a data object value of the pending data handling process can be compared with the dividing threshold. If the data object value of the pending data handling process is greater than the dividing threshold, the historical data handling method with the highest recommended weight in the upper category may be recommended as the data handling method for the pending data handling process. If the data object value of the pending data handling process is less than the dividing threshold, the historical data handling method with the highest recommended weight in the lower category may be recommended as the data handling method for the pending data handling process. In other cases, a different historical data handling method can be selected from the sorted historical data handling methods depending on particular functional needs associated with a historical data handling method or a pending data handling process. For example, in some implementations, following sorting, one or more criterion consistent with this disclosure can be used to make a selection of a particular historical data handling method. After 250*b*, method 200*b* ends.

Figure 3:
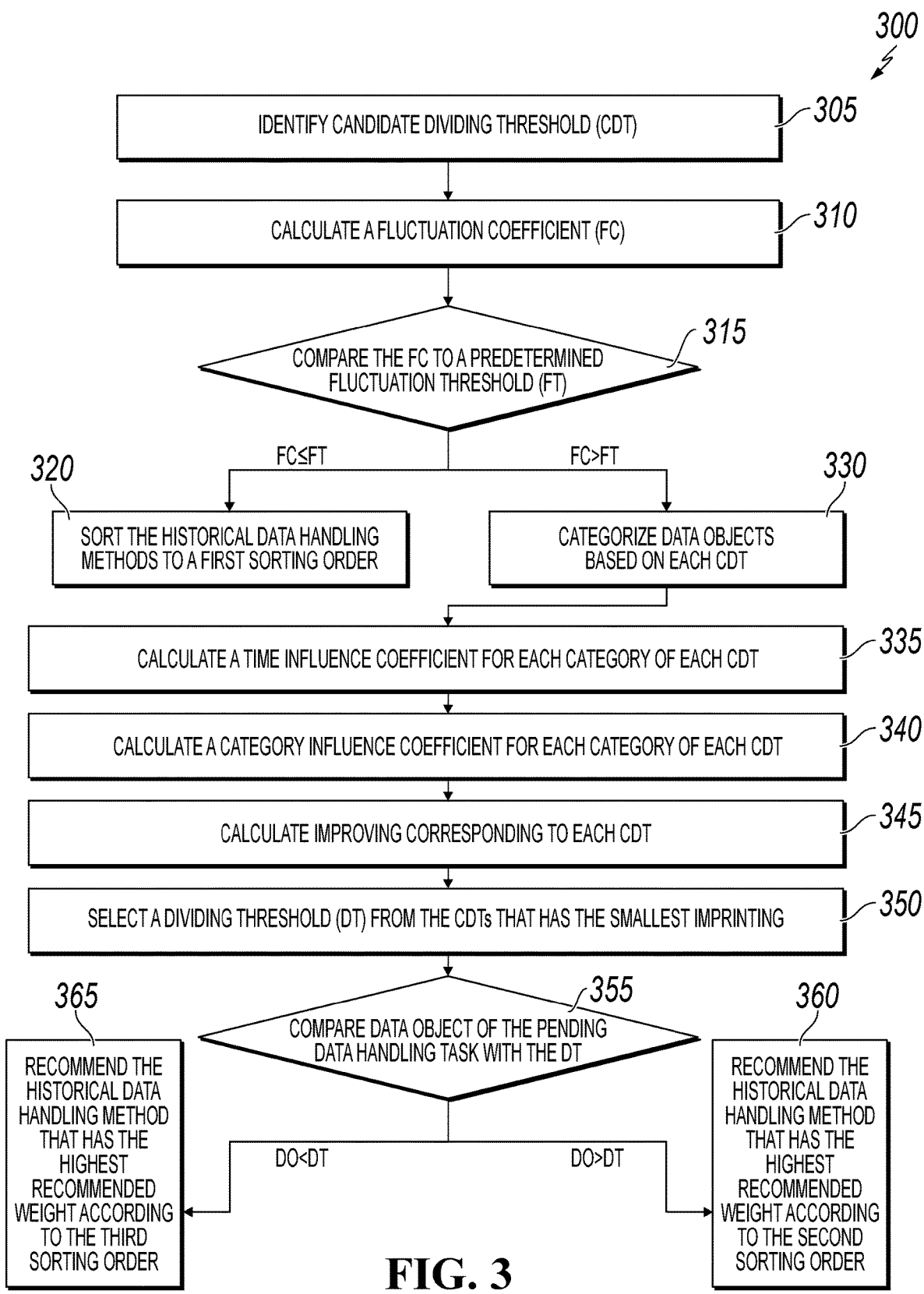
FIG. 3 is a flowchart illustrating an example method for recommending a data handling method for a pending data handling process based on sorting results, according to an implementation of the present disclosure.

FIG. 3 is a flowchart illustrating an example method 300 for recommending a data handling method for a pending data handling process based on sorting results, according to an implementation of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order. At 305, method 300 can determine candidate dividing thresholds based on data objects of the historical data handling processes. In some cases, the candidate dividing thresholds can be the mean values of two consecutive data objects after sorting. That is, data objects of the historical data handling processes can first be sorted based on their values (for example, a payment amount) in an ascending order or a descending order. The mean values of any two consecutive data objects can then be determined as candidate dividing thresholds. The calculation of candidate dividing thresholds can be expressed as:

$$\text{mean}_j = \frac{amt_j + amt_{j+1}}{2}, \quad (3)$$

where $\text{mean}_j$ represents the jth candidate dividing threshold, $amt_j$ represents the jth data object; $amt_{j+1}$ represents the j+1th data object, and j=1, 2, ..., (N−1), where N is the number of historical data handling processes, which is equal to the number of data objects.

Figure 4:
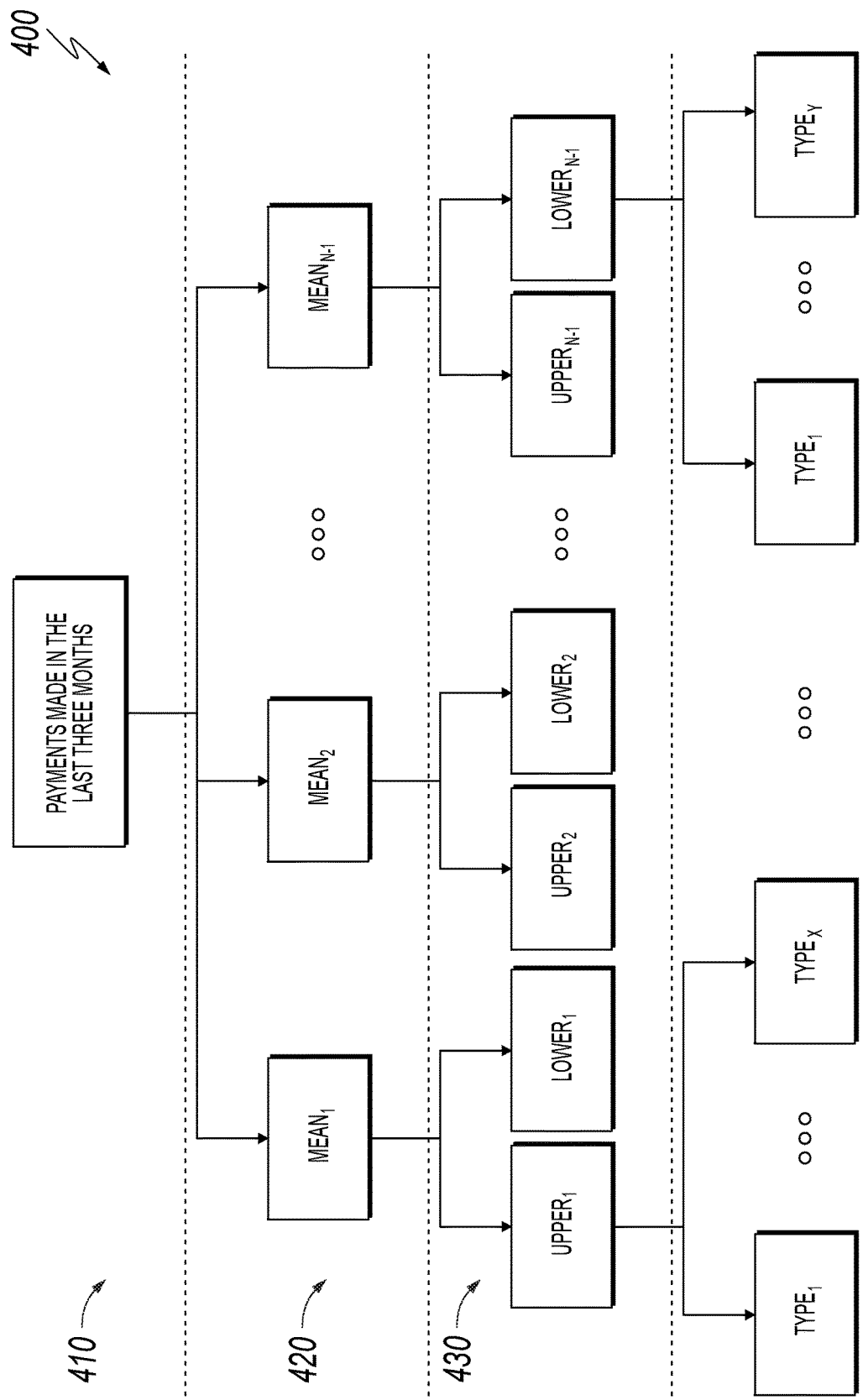
FIG. 4 is a hierarchy diagram illustrating an example of categorized historical data handling methods, according to an implementation of the present disclosure.

Turning to FIG. 4, FIG. 4 is a hierarchy diagram 400 illustrating an example of categorized historical data handling methods, according to an implementation of the present disclosure. In FIG. 4, the historical data handling process can be payment processes performed (or payments made) in the last three months. Layer 420 shows an example of candidate dividing thresholds under the hierarchy 400. Returning to FIG. 3, from 305, method 300 proceeds to 310.

At 310, method 300 calculates a fluctuation coefficient of the data objects. Various methods can be used to calculate the fluctuation coefficient. For example, an average of the candidate dividing thresholds can be calculated, and the total differences between the average and each candidate dividing threshold can be divided by the summation of all candidate dividing thresholds to yield a fluctuation coefficient. In some cases, the Gini coefficient of the data objects can be used as the fluctuation coefficient. From 310, method 300 proceeds to 315.

At 315, method 300 compares the fluctuation coefficient to a predetermined fluctuation threshold used to evaluate volatility or fluctuation of data objects associated with historical data handling processes of an application scenario. If the fluctuation coefficient is less than or equal to the predetermined fluctuation threshold, method 300 can proceed to 320. If the fluctuation coefficient is greater than the predetermined fluctuation threshold, method 300 can proceed to 330.

Suitable fluctuation thresholds can be different for different application scenarios. Using an application scenario of a payment service as an example, a data object of this application scenario can be a payment amount. The historical data handling processes can be the payment processes performed by the user of the pending data handling process in a predetermined recent period. The historical data handling methods can include any payment methods, such as those offered by credit cards, debit cards, TENPAY, APPLE PAY, or ALIPAY. In this application scenario, an example fluctuation threshold can be considered to be a value between 0 and 1.0 (such as, 0.5). When the fluctuation coefficient is less the fluctuation threshold, it can indicate that the payment amount (data object) is relatively stable, and the data objects of historical data handling processes can be considered to have a relatively small influence in making the data handling method recommendation to the pending data handling process. In such cases, method 300 can proceed to 320, where a recommendation for a data handling method can be made based on the time the historical data handling processes were performed and the types of the historical data handling methods. When the fluctuation coefficient is greater than or equal to the fluctuation threshold, the fluctuation of the payment amount can be relatively large and the data objects of historical data handling processes can be considered to have a relatively large influence on making the data handling method recommendation. In such cases, method 300 can proceed to 330, where the data objects of the historical data handling processes can also be included in determining the data handling method for the pending data handling process.

At 320, method 300 sorts the historical data handling methods to a first sorting order based on their corresponding recommended weight. An example method of calculating recommended weight for each type of historical data handling method and sorting the historical data handling methods to the first sorting order is discussed with respect to 230*a* of FIG. 2A, where the calculation of the weighting coefficient for each historical data handling process may be based on the time the historical data handling process was performed, and the calculation of the recommended weight may be based on the type of the historical data handling method. Sorting the historical data handling methods according to the first sorting order can be based on preference characterizations (for example, at least two pieces of preference characterization data). In some implementations, after sorting, the historical data handling method with the highest recommended weight may be recommended as the data handling method for the pending data handling process. In other cases, a different historical data handling method can be selected from the sorted historical data handling methods depending on particular functional needs associated with a historical data handling method or a pending data handling process. For example, in some implementations, following sorting, one or more criterion consistent with this disclosure can be used to make a selection of a particular historical data handling method. From 320, method 300 stops.

At 330, method 300 categorizes historical data handling processes into an upper category and into a lower category for each candidate dividing threshold by comparing it with data objects corresponding to the historical data handling processes. At a high-level, steps 330 through 350 provide an example method for determining a dividing threshold from the candidate dividing thresholds. Returning to the payment service application scenario, a payment system can gather historical data handling information in the application scenario of the payment processes (historical data handling processes) for a certain time period (for example, the prior three months). The historical data handling information can include times in which the historical data handling processes are performed, payment methods (historical data handling methods) used, user identifications associated with the historical data handling processes, and payment amounts (data objects). In some cases, the historical payment process information associated with a user for the pending data handling process can be used to determine the data handling method to be recommended.

In some implementations, the candidate dividing thresholds can be calculated based on Equation (3) as discussed in 305, where $mean_j$ represents the jth candidate dividing threshold, $amt_j$ represents the payment amount of the jth payment process, $amt_{j+1}$ represents the payment amount of the j+1th payment process, and j=1, 2, ..., (N−1), and where N is the number of historical payment processes of the user within the certain time period.

The historical payment processes can then be categorized to an upper category and a lower category for each candidate dividing threshold. For example, for the jth candidate dividing threshold, the historical payment processes with a corresponding payment amount greater than the jth candidate dividing threshold can be categorized into an upper category $upper_j$, and historical payment processes with a corresponding payment amount less than or equal to the candidate dividing threshold services, which have been completed with the payment amount being less than or equal to the jth candidate dividing threshold, can be categorized to a lower category $lower_j$.

Referring again to FIG. 4, layer 430 shows example upper and lower categories for each candidate dividing thresholds under the example hierarchy 400. Returning to FIG. 3, from 330, method 300 proceeds to 335.

At 335, method 300 calculates a time influence coefficient for each category for each candidate dividing threshold. Using the $upper_j$ category for the jth candidate dividing threshold for example, assume that the $upper_j$ category includes m historical payments, the sum of the weighting coefficients corresponding to the historical data handling processes in the upper$_j$ category can be calculated as:

$$\text{split\_sum}_j = \Sigma_m f_k \quad (4),$$

and the time influence coefficient of the upper$_j$ category can be calculated as:

$$sigtime_j = \frac{\text{split\_sum}_j}{\text{mean\_sum}}, \quad (5)$$

where mean_sum represents the summation of the weighting coefficients of all the N historical data handling processes. The time influence coefficient of the lower$_j$ category can be similarly calculated. Therefore, the time influence coefficient of the upper$_j$ category is the ratio between the weighting coefficients of all historical data handling processes in the upper$_j$ category and the weighting coefficients of all historical data handling processes. The time influence coefficient of the lower$_j$ category can be similarly calculated. From 335, method 300 proceeds to 340.

At 340, method 300 calculates a category influence coefficient for each category for each candidate dividing threshold. Using again the upper$_j$ category for the jth candidate dividing threshold, for example, and assuming that the upper$_j$ category includes m historical payments and L payment types are used. As discussed with respect to 220a of FIG. 2A, Equation (2) can be used to calculate a recommended weight, type_sum$_l$, for each of the L payment type. In this case, l represents the lth payment type, x represents the number of payments made using the lth payment type, and f$_l$ represents the weighting coefficient of the payment process performed by using the lth payment type. Referring again to FIG. 4, layer 440 shows example types of historical data handling methods for each upper and lower category of each candidate dividing thresholds under the example hierarchy 400.

A Gini ratio for type l can be calculated as:

$$gini_l = (\text{type}_{sum_l} / \text{split}_{sum_j}) \times (1 - \text{type\_sum}_l / \text{split\_sum}_j); \quad (6)$$

where gini$_l$ represents the Gini ratio of payment type l, split_sum$_j$ represents the sum of the weighting coefficients corresponding to the historical data handling processes in the upper$_j$ category as discussed in the description of equation (4). The category influence coefficient of the upper$_j$ category can be calculated by adding the Gini ratio for all the L types of payment methods, which can be expressed as:

$$\text{sigma}_j = \Sigma_{l=1}^{L} gini_l \quad (7).$$

The category influence coefficient of the lower$_j$ category can be similarly calculated. From 340, method 300 proceeds to 345.

At 345, method 300 calculates an impurity for each candidate dividing threshold. Using the jth candidate dividing threshold for example, its impurity or Gini impurity corresponds to the jth candidate dividing threshold can be calculated as:

$$\text{mean}_{impurity_j} = \Sigma \, sigtime_j \times sigma_j \quad (8),$$

where the summation sign is for adding the time influence coefficient times category influence coefficient for the upper region and the time influence coefficient times category influence coefficient for the lower region corresponding to the jth candidate dividing threshold. Gini impurity is a measure of how often a randomly chosen from a set of elements would be incorrectly labeled if it was randomly labeled according to the distribution of labels in a subset. In other words, Gini impurity measures an expected rate, or the probability of a random event changes to its opposite. The smaller the impurity, the more ordered the subset and the better the categorization. Impurity equals 0 can mean that the subsets are of the same category. From 345, method 300 proceeds to 350.

At 350, method 300 can select a dividing threshold from the candidate dividing thresholds that has the smallest impurity. For example, if mean_impurity$_j$ is the smallest as compared to the other impurity values, then the jth candidate dividing threshold can be selected as the dividing threshold. From 350, method 300 proceeds to 355.

At 355, method 300 compares a data object associated with the pending data handling process with the dividing threshold. If the data object value (for example, a payment amount) is greater than the dividing threshold, method 300 determines that the pending data handling process can be categorized in the upper category. Method 300 proceeds to 360, where the different types of historical data handling methods in the upper category can be sorted to a second sorting order based on their corresponding recommended weights.

If the data object value is less than or equal to the dividing threshold, method 300 determines that the pending data handling process can be categorized into the lower category. Method 300 proceeds to 365, where the different types of historical data handling methods in the lower categories can be sorted to a third sorting order based on their corresponding recommended weights. An example of sorting the historical data handling methods to the second sorting order and the third sorting order are discussed in with respect to 250b of FIG. 2B.

At 360, method 300 recommends the historical data handling method that has the highest recommended weight according to the second sorting order as the data handling method for the pending data handling process. After 360, method 300 stops.

At 365, method 300 recommends the historical data handling method that has the highest recommended weight according to the third sorting order as the data handling method for the pending data handling process. After 365, method 300 stops.

Figure 5:
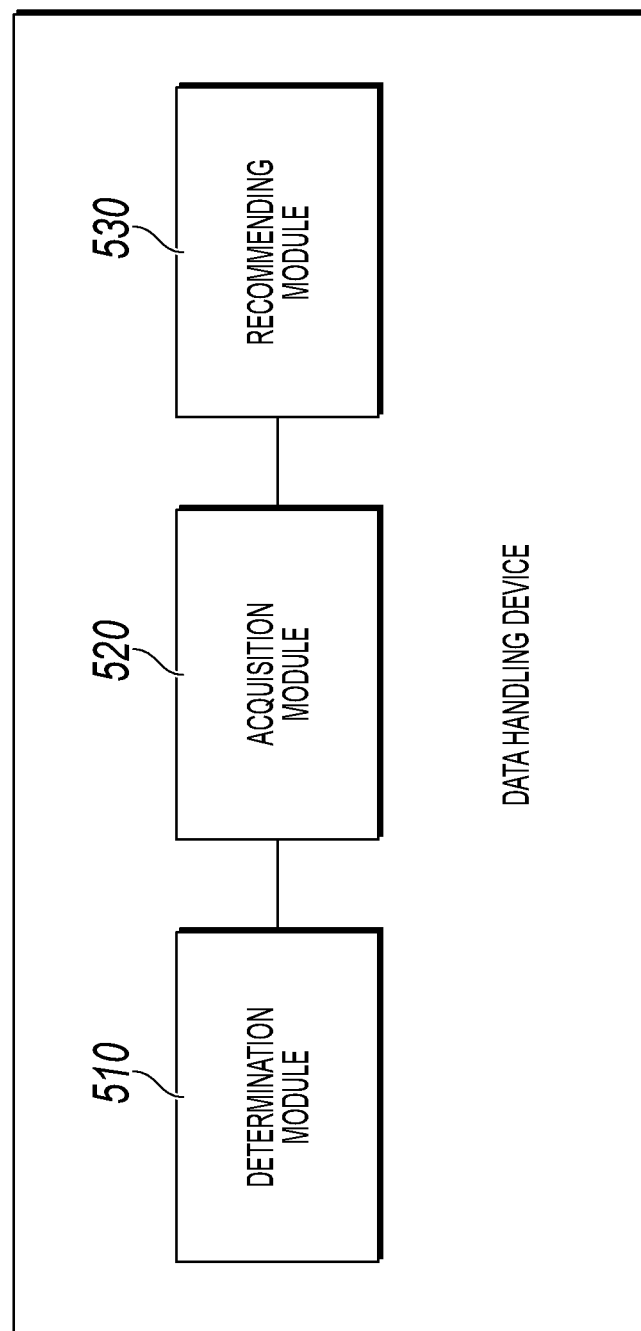
FIG. 5 is a block diagram showing an example data handling device, according to an implementation of the present disclosure.
Figure 6:
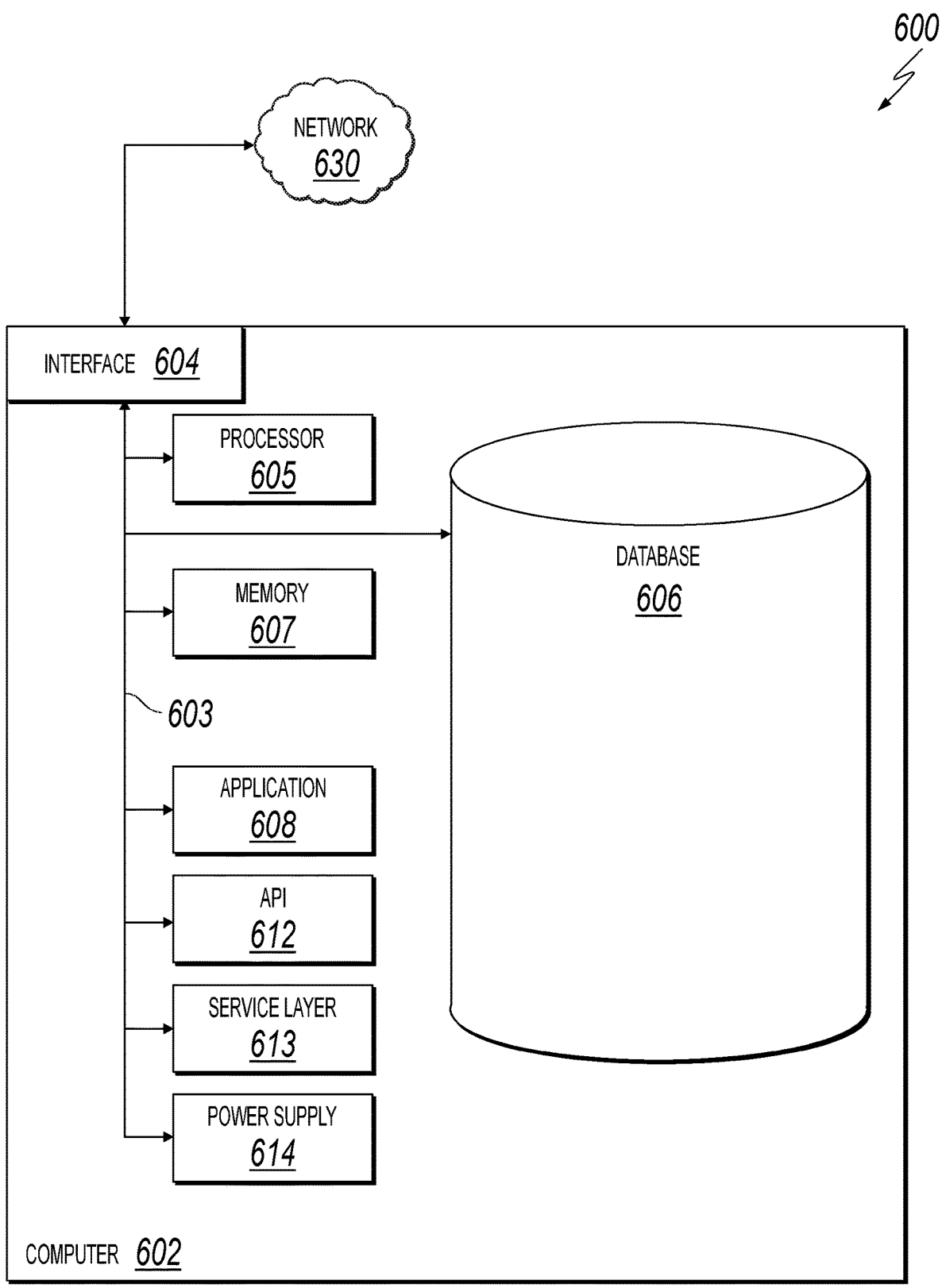
FIG. 6 is a block diagram illustrating an example computer system used to provide computational functionalities associated with described algorithms, methods, functions, processes, flows, and procedures, according to an implementation of the present disclosure.

FIG. 5 is a block diagram illustrating an example of a computer system 500 used to provide computational functionalities associated with described algorithms, methods, functions, processes, flows, and procedures, according to an implementation of the present disclosure. The illustrated computer 502 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 502 can comprise a computer that includes an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a computer system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and comprises logic encoded in software, hardware, or a combination of software and hardware. More specifically, the interface 504 can comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

Described implementations of the subject matter can include one or more features, alone or in combination.

For example, in a first implementation, a computer-implemented method, comprises, identifying attribute information of a pending data handling process to be performed; identifying, based on the attribute information, historical data handling processes for a same application scenario as the pending data handling process; identifying a time that each identified historical data handling process is performed and methods used to perform the identified historical data handling processes; determining a weighting coefficient for each identified historical data handling process, wherein the weighting coefficient is larger when the time of the identified historical data handling process is more recent; calculating weighted identified historical data handling processes by applying the weight coefficient to each identified historical data handling process; determining a recommended weight for each method used to perform the identified historical data handling processes by combining weighted identified historical data handling processes that use the same method; and recommending a method that has the highest recommended weight to perform the pending data handling process.

The foregoing and other described implementations can each, optionally, include one or more of the following features:

A first feature, combinable with any of the following features, wherein: the attribute information includes a user identifier of the pending data handling process, a value of a data object of the pending data handling process, and a time when the pending data handling process is to be performed; and identifying historical data handling processes further comprises identifying historical data handling processes associated with the same user identifier as the pending data handling process, when the value of the data object of the pending data handling process is within a predetermined value interval, or when the time the pending data handling process is to be performed is in a predetermined time interval.

A second feature, combinable with any of the previous or following features, further comprising sorting the methods used to perform the identified historical data handling processes to a first sorting order based on their recommended weight.

A third feature, combinable with any of the previous or following features, further comprising: identifying a data object for each of the identified historical data handling processes and the pending data handling process; determining a dividing threshold for categorize the identified data objects; categorizing the identified historical data handling processes and the pending data handling process to an upper category and a lower category by comparing each identified data object with the dividing threshold; determining a recommended weight for each method used to perform the identified historical data handling processes in the upper category by combining weighted identified historical data handling processes in the upper category that use the same method if the data object of the pending data handling process is in the upper category; and determining a recommended weight for each method used to perform the identified historical data handling processes in the lower category by combining weighted identified historical data handling processes in the lower category that use the same method if the data object of the pending data handling process is in the lower category.

A fourth feature, combinable with any of the previous or following features, further comprising: sorting the methods used to perform the identified historical data handling processes in the upper category to a second sorting order based on their recommended weight; and sorting the methods used to perform the identified historical data handling processes in the lower category to a third sorting order based on their recommended weight.

A fifth feature, combinable with any of the previous or following features, further comprising: calculating a fluctuation coefficient based on a degree of variation of the identified data objects; and determining that the fluctuation coefficient is greater than a predetermined fluctuation threshold.

A sixth feature, combinable with any of the previous or following features, wherein determining the dividing threshold further comprises: identifying a plurality of candidate dividing thresholds based on the identified data objects of the identified historical data handling processes; categorizing the identified historical data handling processes to an upper category and a lower category for each candidate dividing threshold by comparing each identified data object with the candidate dividing threshold; calculating an impurity value based on the identified historical data handling process in each upper category and lower category for each candidate dividing threshold; and selecting the candidate dividing threshold that corresponds to the smallest impurity value as the dividing threshold.

A seventh feature, combinable with any of the previous or following features, wherein calculating the impurity value further comprises: calculating a time influence coefficient for each upper category and each lower category for each candidate dividing threshold based on the time each corresponding identified historical data handling process is performed; calculating a category influence coefficient for each upper category and each lower category for each candidate dividing threshold based on the method used to perform each corresponding identified historical data handling process; and calculating the impurity value based on the time influence coefficient and the category influence coefficient.

An eighth feature, combinable with any of the previous or following features, further comprising: identifying a data object for each of the identified historical data handling processes; calculating a fluctuation coefficient based on a degree of variation of the identified data objects; and determining that the fluctuation coefficient is less than or equal to a predetermined fluctuation threshold.

In a second implementation, a non-transitory, computer-readable medium storing one or more instructions executable by a computer system to perform operations, comprising: identifying attribute information of a pending data handling process to be performed; identifying, based on the attribute information, historical data handling processes for a same application scenario as the pending data handling process; identifying a time that each identified historical data handling process is performed and methods used to perform the identified historical data handling processes; determining a weighting coefficient for each identified historical data handling process, wherein the weighting coefficient is larger when the time of the identified historical data handling process is more recent; calculating weighted identified historical data handling processes by applying the weight coefficient to each identified historical data handling process; determining a recommended weight for each method used to perform the identified historical data handling processes by combining weighted identified historical data handling processes that use the same method; and recommending a method that has the highest recommended weight to perform the pending data handling process.

The foregoing and other described implementations can each, optionally, include one or more of the following features:

A first feature, combinable with any of the following features, wherein: the attribute information includes a user identifier of the pending data handling process, a value of a data object of the pending data handling process, and a time when the pending data handling process is to be performed; and identifying historical data handling processes further comprises identifying historical data handling processes associated with the same user identifier as the pending data handling process, when the value of the data object of the pending data handling process is within a predetermined value interval, or when the time the pending data handling process is to be performed is in a predetermined time interval.

A second feature, combinable with any of the previous or following features, further comprising sorting the methods used to perform the identified historical data handling processes to a first sorting order based on their recommended weight.

A third feature, combinable with any of the previous or following features, further comprising: identifying a data object for each of the identified historical data handling processes and the pending data handling process; determining a dividing threshold for categorize the identified data objects; categorizing the identified historical data handling processes and the pending data handling process to an upper category and a lower category by comparing each identified data object with the dividing threshold; determining a recommended weight for each method used to perform the identified historical data handling processes in the upper category by combining weighted identified historical data handling processes in the upper category that use the same method if the data object of the pending data handling process is in the upper category; and determining a recommended weight for each method used to perform the identified historical data handling processes in the lower category by combining weighted identified historical data handling processes in the lower category that use the same method if the data object of the pending data handling process is in the lower category.

A fourth feature, combinable with any of the previous or following features, further comprising: sorting the methods used to perform the identified historical data handling processes in the upper category to a second sorting order based on their recommended weight; and sorting the methods used to perform the identified historical data handling processes in the lower category to a third sorting order based on their recommended weight.

A fifth feature, combinable with any of the previous or following features, further comprising: calculating a fluctuation coefficient based on a degree of variation of the identified data objects; and determining that the fluctuation coefficient is greater than a predetermined fluctuation threshold.

A sixth feature, combinable with any of the previous or following features, wherein dividing the threshold further comprises: identifying a plurality of candidate dividing thresholds based on the identified data objects of the identified historical data handling processes; categorizing the identified historical data handling processes to an upper category and a lower category for each candidate dividing threshold by comparing each identified data object with the candidate dividing threshold; calculating an impurity value based on the identified historical data handling process in each upper category and lower category for each candidate dividing threshold; and selecting the candidate dividing threshold that corresponds to the smallest impurity value as the dividing threshold.

A seventh feature, combinable with any of the previous or following features, wherein calculating the impurity value further comprises: calculating a time influence coefficient for each upper category and each lower category for each candidate dividing threshold based on the time each corresponding identified historical data handling process is performed; calculating a category influence coefficient for each upper category and each lower category for each candidate dividing threshold based on the method used to perform each corresponding identified historical data handling process; and calculating the impurity value based on the time influence coefficient and the category influence coefficient.

An eighth feature, combinable with any of the previous or following features, further comprising: identifying a data object for each of the identified historical data handling processes; calculating a fluctuation coefficient based on a degree of variation of the identified data objects; and determining that the fluctuation coefficient is less than or equal to a predetermined fluctuation threshold.

In a third implementation, a computer-implemented system, comprises: identifying attribute information of a pending data handling process to be performed; identifying, based on the attribute information, historical data handling processes for a same application scenario as the pending data handling process; identifying a time that each identified historical data handling process is performed and methods used to perform the identified historical data handling processes; determining a weighting coefficient for each identified historical data handling process, wherein the weighting coefficient is larger when the time of the identified historical data handling process is more recent; calculating weighted identified historical data handling processes by applying the weight coefficient to each identified historical data handling process; determining a recommended weight for each method used to perform the identified historical data handling processes by combining weighted identified historical data handling processes that use the same method; and recommending a method that has the highest recommended weight to perform the pending data handling process.

The foregoing and other described implementations can each, optionally, include one or more of the following features:

A first feature, combinable with any of the following features, wherein: the attribute information includes a user identifier of the pending data handling process, a value of a data object of the pending data handling process, and a time when the pending data handling process is to be performed; and identifying historical data handling processes further comprises identifying historical data handling processes associated with the same user identifier as the pending data handling process, when the value of the data object of the pending data handling process is within a predetermined value interval, or when the time the pending data handling process is to be performed is in a predetermined time interval.

A second feature, combinable with any of the previous or following features, further comprising sorting the methods used to perform the identified historical data handling processes to a first sorting order based on their recommended weight.

A third feature, combinable with any of the previous or following features, further comprising: identifying a data object for each of the identified historical data handling processes and the pending data handling process; determining a dividing threshold for categorize the identified data objects; categorizing the identified historical data handling processes and the pending data handling process to an upper category and a lower category by comparing each identified data object with the dividing threshold; determining a recommended weight for each method used to perform the identified historical data handling processes in the upper category by combining weighted identified historical data handling processes in the upper category that use the same method if the data object of the pending data handling process is in the upper category; and determining a recommended weight for each method used to perform the identified historical data handling processes in the lower category by combining weighted identified historical data handling processes in the lower category that use the same method if the data object of the pending data handling process is in the lower category.

A fourth feature, combinable with any of the previous or following features, further comprising: sorting the methods used to perform the identified historical data handling processes in the upper category to a second sorting order based on their recommended weight; and sorting the methods used to perform the identified historical data handling processes in the lower category to a third sorting order based on their recommended weight.

A fifth feature, combinable with any of the previous or following features, further comprising: calculating a fluctuation coefficient based on a degree of variation of the identified data objects; and determining that the fluctuation coefficient is greater than a predetermined fluctuation threshold.

A sixth feature, combinable with any of the previous or following features, wherein determining the dividing threshold further comprises: identifying a plurality of candidate dividing thresholds based on the identified data objects of the identified historical data handling processes; categorizing the identified historical data handling processes to an upper category and a lower category for each candidate dividing threshold by comparing each identified data object with the candidate dividing threshold; calculating an impurity value based on the identified historical data handling process in each upper category and lower category for each candidate dividing threshold; and selecting the candidate dividing threshold that corresponds to the smallest impurity value as the dividing threshold.

A seventh feature, combinable with any of the previous or following features, wherein calculating the impurity value further comprises: calculating a time influence coefficient for each upper category and each lower category for each candidate dividing threshold based on the time each corresponding identified historical data handling process is performed; calculating a category influence coefficient for each upper category and each lower category for each candidate dividing threshold based on the method used to perform each corresponding identified historical data handling process; and calculating the impurity value based on the time influence coefficient and the category influence coefficient.

An eighth feature, combinable with any of the previous or following features, further comprising: identifying a data object for each of the identified historical data handling processes; calculating a fluctuation coefficient based on a degree of variation of the identified data objects; and determining that the fluctuation coefficient is less than or equal to a predetermined fluctuation threshold.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   identifying attribute information of a pending data handling process to be performed;
   identifying, based on the attribute information, historical data handling processes for a same application scenario as the pending data handling process;
   identifying a time that each identified historical data handling process is performed and methods used to perform the identified historical data handling processes;
   determining a weighting coefficient for each identified historical data handling process, wherein the weighting coefficient is larger when the time of the identified historical data handling process is more recent;
   calculating weighted identified historical data handling processes by applying the weight coefficient to each identified historical data handling process;
   determining a recommended weight for each method used to perform the identified historical data handling processes by combining weighted identified historical data handling processes that use the same method; and
   recommending a method that has the highest recommended weight to perform the pending data handling process.

2. The computer-implemented method of claim 1, wherein:
   the attribute information includes a user identifier of the pending data handling process, a value of a data object of the pending data handling process, and a time when the pending data handling process is to be performed; and
   identifying historical data handling processes further comprises identifying historical data handling processes associated with the same user identifier as the pending data handling process, when the value of the data object of the pending data handling process is within a predetermined value interval, or when the time the pending data handling process is to be performed is in a predetermined time interval.

3. The computer-implemented method of claim 1, further comprising sorting the methods used to perform the identified historical data handling processes to a first sorting order based on their recommended weight.

4. The computer-implemented method of claim 1, further comprising:
identifying a data object for each of the identified historical data handling processes and the pending data handling process;
determining a dividing threshold for categorize the identified data objects;
categorizing the identified historical data handling processes and the pending data handling process to an upper category and a lower category by comparing each identified data object with the dividing threshold;
determining a recommended weight for each method used to perform the identified historical data handling processes in the upper category by combining weighted identified historical data handling processes in the upper category that use the same method if the data object of the pending data handling process is in the upper category; and
determining a recommended weight for each method used to perform the identified historical data handling processes in the lower category by combining weighted identified historical data handling processes in the lower category that use the same method if the data object of the pending data handling process is in the lower category.

5. The computer-implemented method of claim 4, further comprising:
sorting the methods used to perform the identified historical data handling processes in the upper category to a second sorting order based on their recommended weight; and
sorting the methods used to perform the identified historical data handling processes in the lower category to a third sorting order based on their recommended weight.

6. The computer-implemented method of claim 4, further comprising:
calculating a fluctuation coefficient based on a degree of variation of the identified data objects; and
determining that the fluctuation coefficient is greater than a predetermined fluctuation threshold.

7. The computer-implemented method of claim 4, wherein determining the dividing threshold further comprises:
identifying a plurality of candidate dividing thresholds based on the identified data objects of the identified historical data handling processes;
categorizing the identified historical data handling processes to an upper category and a lower category for each candidate dividing threshold by comparing each identified data object with the candidate dividing threshold;
calculating an impurity value based on the identified historical data handling process in each upper category and lower category for each candidate dividing threshold; and
selecting the candidate dividing threshold that corresponds to the smallest impurity value as the dividing threshold.

8. The computer-implemented method of claim 7, wherein calculating the impurity value further comprises:
calculating a time influence coefficient for each upper category and each lower category for each candidate dividing threshold based on the time each corresponding identified historical data handling process is performed;
calculating a category influence coefficient for each upper category and each lower category for each candidate dividing threshold based on the method used to perform each corresponding identified historical data handling process; and
calculating the impurity value based on the time influence coefficient and the category influence coefficient.

9. The computer-implemented method of claim 1, further comprising:
identifying a data object for each of the identified historical data handling processes;
calculating a fluctuation coefficient based on a degree of variation of the identified data objects; and
determining that the fluctuation coefficient is less than or equal to a predetermined fluctuation threshold.

10. A non-transitory, computer-readable medium storing one or more instructions executable by a computer system to perform operations comprising:
identifying attribute information of a pending data handling process to be performed;
identifying, based on the attribute information, historical data handling processes for a same application scenario as the pending data handling process;
identifying a time that each identified historical data handling process is performed and methods used to perform the identified historical data handling processes;
determining a weighting coefficient for each identified historical data handling process, wherein the weighting coefficient is larger when the time of the identified historical data handling process is more recent;
calculating weighted identified historical data handling processes by applying the weight coefficient to each identified historical data handling process;
determining a recommended weight for each method used to perform the identified historical data handling processes by combining weighted identified historical data handling processes that use the same method; and
recommending a method that has the highest recommended weight to perform the pending data handling process.

11. The non-transitory, computer-readable medium of claim 10, wherein:
the attribute information includes a user identifier of the pending data handling process, a value of a data object of the pending data handling process, and a time when the pending data handling process is to be performed; and
identifying historical data handling processes further comprises identifying historical data handling processes associated with the same user identifier as the pending data handling process, when the value of the data object of the pending data handling process is within a predetermined value interval, or when the time the pending data handling process is to be performed is in a predetermined time interval.

12. The non-transitory, computer-readable medium of claim 10, further comprising sorting the methods used to perform the identified historical data handling processes to a first sorting order based on their recommended weight.

13. The non-transitory, computer-readable medium of claim 10, further comprising:
identifying a data object for each of the identified historical data handling processes and the pending data handling process;
determining a dividing threshold for categorize the identified data objects;

categorizing the identified historical data handling processes and the pending data handling process to an upper category and a lower category by comparing each identified data object with the dividing threshold;

determining a recommended weight for each method used to perform the identified historical data handling processes in the upper category by combining weighted identified historical data handling processes in the upper category that use the same method if the data object of the pending data handling process is in the upper category; and determining a recommended weight for each method used to perform the identified historical data handling processes in the lower category by combining weighted identified historical data handling processes in the lower category that use the same method if the data object of the pending data handling process is in the lower category.

14. The non-transitory, computer-readable medium of claim 13, further comprising:

sorting the methods used to perform the identified historical data handling processes in the upper category to a second sorting order based on their recommended weight; and sorting the methods used to perform the identified historical data handling processes in the lower category to a third sorting order based on their recommended weight.

15. The non-transitory, computer-readable medium of claim 13, further comprising:

calculating a fluctuation coefficient based on a degree of variation of the identified data objects; and determining that the fluctuation coefficient is greater than a predetermined fluctuation threshold.

16. The non-transitory, computer-readable medium of claim 13, further comprising:

identifying a plurality of candidate dividing thresholds based on the identified data objects of the identified historical data handling processes;

categorizing the identified historical data handling processes to an upper category and a lower category for each candidate dividing threshold by comparing each identified data object with the candidate dividing threshold;

calculating an impurity value based on the identified historical data handling process in each upper category and lower category for each candidate dividing threshold; and selecting the candidate dividing threshold that corresponds to the smallest impurity value as the dividing threshold.

17. The non-transitory, computer-readable medium of claim 16, further comprising:

calculating a time influence coefficient for each upper category and each lower category for each candidate dividing threshold based on the time each corresponding identified historical data handling process is performed;

calculating a category influence coefficient for each upper category and each lower category for each candidate dividing threshold based on the method used to perform each corresponding identified historical data handling process; and calculating the impurity value based on the time influence coefficient and the category influence coefficient.

18. The non-transitory, computer-readable medium of claim 10, further comprising:

identifying a data object for each of the identified historical data handling processes;

calculating a fluctuation coefficient based on a degree of variation of the identified data objects; and determining that the fluctuation coefficient is less than or equal to a predetermined fluctuation threshold.

19. A computer-implemented system, comprising:

one or more computers; and one or more computer memory devices interoperably coupled with the one or more computers and having tangible, non-transitory, machine-readable media storing instructions that, when executed by the one or more computers, perform operations comprising:

identifying attribute information of a pending data handling process to be performed;

identifying, based on the attribute information, historical data handling processes for a same application scenario as the pending data handling process;

identifying a time that each identified historical data handling process is performed and methods used to perform the identified historical data handling processes;

determining a weighting coefficient for each identified historical data handling process, wherein the weighting coefficient is larger when the time of the identified historical data handling process is more recent;

calculating weighted identified historical data handling processes by applying the weight coefficient to each identified historical data handling process;

determining a recommended weight for each method used to perform the identified historical data handling processes by combining weighted identified historical data handling processes that use the same method; and recommending a method that has the highest recommended weight to perform the pending data handling process.

20. The computer-implemented system of claim 19, wherein:

the attribute information includes a user identifier of the pending data handling process, a value of a data object of the pending data handling process, and a time when the pending data handling process is to be performed; and identifying historical data handling processes further comprises identifying historical data handling processes associated with the same user identifier as the pending data handling process, when the value of the data object of the pending data handling process is within a predetermined value interval, or when the time the pending data handling process is to be performed is in a predetermined time interval.

* * * * *

UNITED STATES PATENT AND TRADEMARK OFFICE
CERTIFICATE OF CORRECTION

| | | |
|---|---|---|
| PATENT NO. | : 10,657,143 B2 | Page 1 of 1 |
| APPLICATION NO. | : 15/717445 | |
| DATED | : May 19, 2020 | |
| INVENTOR(S) | : Dandan Wang, Xiaofeng Pan and Di Xu | |

It is certified that error appears in the above-identified patent and that said Letters Patent is hereby corrected as shown below:

On the Title Page

Column 1, Prior Publication Data, Line 2, Below "2018" insert -- Related U.S. Application Data Continuation of application No. PCT/CN2016/076411, --, as a new field entry.

Signed and Sealed this
Thirteenth Day of October, 2020

Andrei Iancu
*Director of the United States Patent and Trademark Office*